(12) United States Patent
Lotha

(10) Patent No.: US 12,179,292 B2
(45) Date of Patent: Dec. 31, 2024

(54) WELDING CAP COOLING WATER CONTROLLER AND METHOD OF CONTROLLING A WELDING CAP COOLING WATER CONTROLLER

(71) Applicant: Buerkert Werke Gmbh & Co. KG, Ingelfingen (DE)

(72) Inventor: Hartmuth Lotha, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 755 days.

(21) Appl. No.: 17/482,801

(22) Filed: Sep. 23, 2021

(65) Prior Publication Data

US 2022/0088726 A1 Mar. 24, 2022

(30) Foreign Application Priority Data

Sep. 23, 2020 (DE) .................. 10 2020 124 846.6

(51) Int. Cl.
*B23K 37/00* (2006.01)
*B23K 11/30* (2006.01)
*B23K 11/36* (2006.01)

(52) U.S. Cl.
CPC ........ *B23K 37/003* (2013.01); *B23K 11/3018* (2013.01); *B23K 11/36* (2013.01)

(58) Field of Classification Search
None
See application file for complete search history.

(56) References Cited

U.S. PATENT DOCUMENTS

| | | | |
|---|---|---|---|
| 6,026,682 A | 2/2000 | Mccormick | |
| 11,103,951 B2 | 8/2021 | Guenther | |
| 2014/0216708 A1 | 8/2014 | Hamm et al. | |
| 2017/0144245 A1 | 5/2017 | Lotha et al. | |
| 2018/0071857 A1 | 3/2018 | Guenther | |
| 2022/0088726 A1* | 3/2022 | Lotha ............. | B23K 11/3018 |

FOREIGN PATENT DOCUMENTS

| | | |
|---|---|---|
| DE | 102013101104 A1 | 8/2014 |
| DE | 102015204812 A1 | 9/2016 |
| DE | 102015120222 A1 | 5/2017 |

* cited by examiner

*Primary Examiner* — Geoffrey S Evans
(74) *Attorney, Agent, or Firm* — Dilworth IP, LLC

(57) ABSTRACT

A method of controlling a welding cap cooling water controller having a cooling water pipe which includes a test section with a welding cap between an inlet valve in the cooling water inlet and a return valve in the cooling water return, in a first step the pressure of the cooling water in the test section is increased to an overpressure which is above a supply pressure that prevails in the test section during the welding process with the inlet valve open and the return valve open, and subsequently a pressure drop measurement is performed at overpressure. Furthermore, a welding cap cooling water controller is provided which is adapted to carry out such a method.

11 Claims, 1 Drawing Sheet

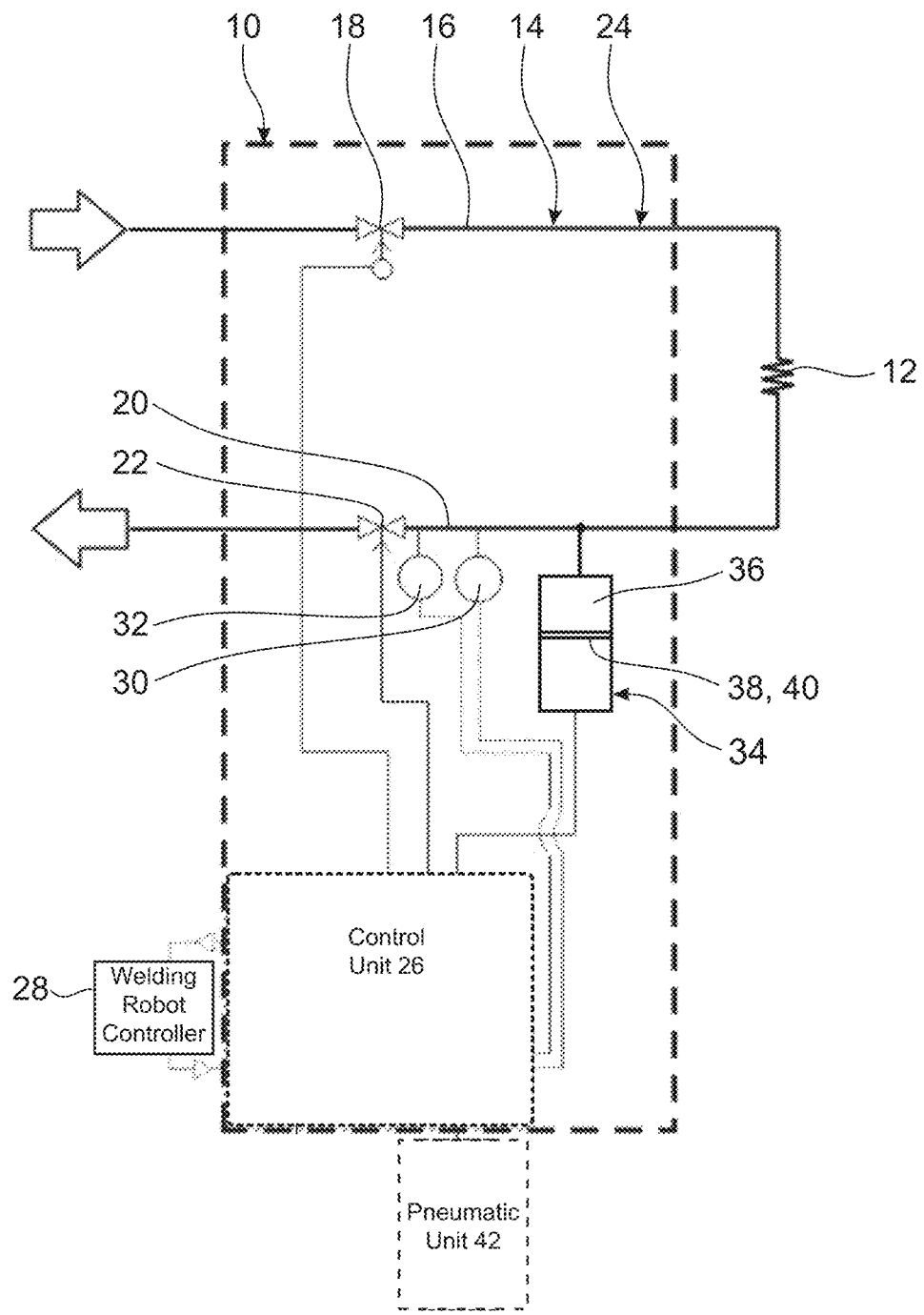

WELDING CAP COOLING WATER CONTROLLER AND METHOD OF CONTROLLING A WELDING CAP COOLING WATER CONTROLLER

FIELD OF THE INVENTION

The invention relates to a method of controlling a welding cap cooling water controller. Furthermore, the invention relates to a welding cap cooling water controller including a cooling water pipe which includes a cooling water inlet leading towards at least one welding cap and having a switchable inlet valve for closing the cooling water inlet, and a cooling water return leading away from the at least one welding cap and having a switchable return valve for closing the cooling water return.

BACKGROUND

Robotic spot-welding systems are employed in the automotive industry in particular and are required to meet high quality standards. High availability requirements of up to 100% demand maximum reliability of all components. The welding caps are subjected to high thermal stresses and wear and are permanently cooled by cooling water. The welding caps used are designed as wear parts from the outset and have to be milled off and replaced regularly.

Leakage may occur during milling of the caps, during restart, after a cap change or due to material fatigue, material defects or faulty feed and return hose paths or the connections thereof. If a leak is not detected in time, escaping cooling water may lead to system downtimes and even impairment of sensitive system components. Therefore, cooling water flow is usually monitored in order to detect an unexpected drop in cooling water flow in specific sections, which is indicative of a leak.

However, due to the limited detection threshold of flow monitoring, only larger leaks can be reliably detected in this way, while minor leaks are below the detection threshold and are therefore not detected. Minor leaks therefore are often not detected until they lead to components with defective spot welds that fail quality control and have to be discarded as rejects. The costs incurred in this process are very high.

The object of the invention is therefore to provide a method of controlling a welding cap cooling water controller by means of which even minor leaks can be detected reliably and in a short time. A further object of the invention is to provide a welding cap cooling water controller which is adapted to carry out the method.

SUMMARY

The invention provides a method of controlling a welding cap cooling water controller is provided. Here, the welding cap cooling water controller has a cooling water pipe which includes a cooling water inlet leading towards at least one welding cap and having a switchable inlet valve for closing the cooling water inlet and a cooling water return leading away from the at least one welding cap and having a switchable return valve for closing the cooling water return. The section of the cooling water pipe that is arranged downstream of the inlet valve and upstream of the return valve forms a test section of the cooling water pipe. The welding cap cooling water controller further has a pressure sensor that is configured for pressure measurement of the cooling water in the test section, and a control unit that is coupled to the pressure sensor, the inlet valve and the return valve for signal transmission. The method includes the steps of:

increasing the pressure of the cooling water in the test section to an overpressure that is above a supply pressure which prevails in the test section during the welding process with the inlet valve open and the return valve open; and performing a pressure drop measurement at overpressure.

The idea according to the invention consists in detecting a leakage using a pressure drop measurement. This means that the measured pressure $p_1$ at a point in time $t_1$ is compared to the measured pressure $p_2$ at a point in time $t_2$. If the change is above a particular threshold value, a leakage is detected. It has been found here that in the case of minor leaks, which in particular cannot be reliably detected by means of a flow monitoring, only comparatively small quantities of cooling water escape via the leak, and therefore a comparatively long period of time is required between two pressure measurements in order to reliably detect such leaks using a pressure drop measurement. By increasing the pressure of the cooling water in the test section for the pressure drop measurement, the quantity of cooling water that escapes via a leak per unit of time also increases correspondingly, which in turn results in a faster or greater pressure drop. In this way, even minor leakages can be reliably detected in a short time by means of the pressure drop measurement.

In particular, the inlet valve and the return valve are closed during the pressure drop measurement, which means that the pressure drop measurement is limited to the test section and thus any possible leak can be located more easily. Furthermore, in this way the pressure drop measurement is carried out independently of the cooling water flow and the workshop cooling water pressure, i.e. the cooling water pressure that is applied to the cooling water inlet on the supply side and forms the supply pressure in the test section during welding when the inlet valve and the return valve are open.

The required duration of the pressure drop measurement can, in particular, be so short here that the pressure drop measurement can be effected during a restart of the spot welding system with which the welding cap cooling water controller is associated or during a cap milling interval during which the at least one welding cap with which the welding cap cooling water controller is associated is milled off.

In one embodiment, the overpressure amounts to at least 110%, in particular at least 130% of the supply pressure, in order to be able to reliably detect minor leaks in a particularly short time.

Additionally, or alternatively, the overpressure may be at least 6 bars, in particular at least 7.5 bars, so that the pressure drop in the event of a leakage is particularly large and thus particularly easy to detect in a pressure drop measurement.

In a further embodiment, provision is made for a switchable expansion cylinder which is coupled to the control unit for signal transmission and is configured to receive cooling water from the test section and to return cooling water to the test section. In particular, the expansion cylinder includes an expansion chamber having a movable wall which is adapted to be acted upon with an adjustable counter pressure in relation to the pressure of the cooling water in the test section. By means of the expansion cylinder, the pressure in the test section can be increased or decreased by appropriately changing the volume of the expansion cylinder that is filled with cooling water from the test section.

According to one embodiment, the method of increasing the pressure of the cooling water in the test section to an overpressure includes the following sequence of steps:
closing the return valve; and
closing the inlet valve with a time delay.

Here, the momentum of the cooling water flowing into the test section is utilized to produce an overpressure in the test section with little effort.

Within the meaning of the invention, "with a time delay" is understood to mean in particular a period of time of at least one second or at least one tenth of a second.

According to an alternative embodiment, the method of increasing the pressure of the cooling water in the test section to an overpressure includes the following sequence of steps:
closing the return valve and the inlet valve; and
increasing the pressure in the test section by means of the expansion cylinder.

In this way, an overpressure with a particularly large pressure difference compared to the supply pressure can be provided.

In a further alternative embodiment, the method of increasing the pressure of the cooling water in the test section to an overpressure includes the following sequence of steps:
closing the return valve and the inlet valve;
reducing the pressure in the test section by means of the expansion cylinder; and
increasing the pressure in the test section by means of the expansion cylinder.

This embodiment has the advantage that after reducing the pressure, initially a low pressure prevails in the test section, which can be made use of to carry out a welding cap change involving a relatively low loss of cooling water.

In this case, when closing the return valve and the inlet valve, the return valve may be closed first and, with a time delay relative thereto, the inlet valve may be closed, in order to utilize the momentum of the cooling water flowing into the test section to increase the pressure in the test section. In combination with the expansion cylinder, a particularly high overpressure can be generated in the test section in this way.

According to a further alternative embodiment, the method of increasing the pressure of the cooling water in the test section to an overpressure includes the following sequence of steps:
closing the inlet valve;
closing the return valve with a time delay;
reducing the pressure in the test section by means of the expansion cylinder;
opening and time-delayed closing of the inlet valve; and
increasing the pressure in the test section by means of the expansion cylinder.

Here, the point in time after reducing the pressure can be utilized for a welding cap change involving a relatively low loss of cooling water. By subsequently opening the inlet valve for a short time, any cooling water that escaped during the welding cap change can be replaced in the test section and the momentum of the cooling water flowing into the test section can be made use of to increase the pressure in the test section. Therefore, after a welding cap change, a particularly high overpressure can be generated in the test section for the pressure drop measurement.

According to the invention, to achieve the abovementioned object, a welding cap cooling water controller including a cooling water pipe is also provided, which includes a cooling water inlet leading towards at least one welding cap and having a switchable inlet valve for closing the cooling water inlet and a cooling water return leading away from the at least one welding cap and having a switchable return valve for closing the cooling water return. The section of the cooling water pipe that is arranged downstream of the inlet valve and upstream of the return valve forms a test section of the cooling water pipe. The welding cap cooling water controller further has a pressure sensor that is configured for pressure measurement of the cooling water in the test section, and a control unit that is coupled to the pressure sensor, the inlet valve and the return valve for signal transmission. Here, the control unit is configured to carry out the method according to the invention having the advantages mentioned above.

BRIEF DESCRIPTION OF THE DRAWINGS

FIG. 1 shows a schematic representation of a welding cap cooling water controller or control system according to the invention.

DETAILED DESCRIPTION

FIG. 1 illustrates a welding cap cooling water controller 10 for a welding cap 12 of a welding robot.

The welding cap cooling water controller 10 has a cooling water pipe 14 having a cooling water inlet 16, which leads to the welding cap 12 and includes an inlet valve 18, and a cooling water return 20, which leads away from the welding cap 12 and includes a return valve 22.

The cooling water pipe 14 is here part of a cooling water circuit through which cooling water is passed to cool the welding cap 12 during operation. The arrows in FIG. 1 illustrate the direction of flow of the cooling water through the cooling water pipe 14.

The section of the cooling water pipe 14 extending in the direction of flow from the inlet valve 18 to the return valve 22 forms a test section 24 of the cooling water pipe 14.

In an alternative embodiment, instead of one welding cap 12, a plurality of welding caps 12 may be provided, which are cooled by means of the welding cap cooling water controller 10. In this case, the welding caps 12 are in fluid communication with each other in the test section 24, for example by means of a series connection.

The inlet valve 18 and the return valve 22 each have a closed position, in which no cooling water can flow through the respective valve 18, 22, and each have a fully open position, in which a maximum amount of cooling water per unit time can flow through the respective valve 18, 22.

In the present embodiment, the inlet valve 18 is a flow control valve and the return valve 22 is a control valve.

Basically, the valves 18, 22 may be any desired valves as long as they each have one closed position and one open position. Preferably, at least one of the valves 18, 22 is a flow control valve to allow control and/or adjustment of the amount of cooling water flowing through the test section and/or the welding cap 12.

For open- and/or closed-loop control of the valves 18, 22, the welding cap cooling water controller 10 includes an electronic control unit 26 that is connected to the valves 18, 22 in a signal-transmitting manner.

The control unit 26 further forms an interface through which the welding cap cooling water controller 10 is coupled to a welding robot controller 28 of the welding robot in a signal-transmitting manner.

The welding cap cooling water controller 10 further has a pressure sensor 30, by means of which the pressure of the cooling water in the test section 24 can be measured and monitored, and a flow sensor 32, which is configured to continuously determine the volume flow rate of the cooling water in the test section 24. The pressure sensor 30 and the flow sensor 32 are coupled to the control unit 26 for signal transmission.

The flow sensor 32 is optional and may be dispensed with in an alternative embodiment.

Not shown in this context are any temperature sensors, which are arranged within or in the vicinity of the flow sensor 32, if possible, so that the temperature of the cooling water can be detected in addition to the volume flow rate and taken into account in the control unit 26 for adjusting the flow control valve.

Furthermore, the welding cap cooling water controller 10 includes an expansion cylinder 34, which is coupled to the control unit 26 for signal transmission.

The expansion cylinder 34 has an expansion chamber 36 fluidically coupled to the test section 24 and a piston 38 that is adjustable by motor (i.e., electrically, hydraulically, pneumatically, etc.) and has a movable wall 40 that defines the expansion chamber 36.

The expansion chamber 36 provides a volume that expands under the pressure of the coolant in the test section 24. The position of the piston 38 can be used to adjust the volume of the expansion chamber 36, and thus the amount of cooling water that is received from, and returned to, the test section 24. In other words, the expansion cylinder 34 can be used to adjust the total volume, consisting of the volume of the test section 24 and the volume of the expansion chamber 36, that is available to receive cooling water.

In the present exemplary embodiment, the expansion cylinder 34 has a diameter of 60 mm, which should not be understood in a limiting sense. As a result, it is particularly compact and can be arranged in the immediate vicinity of the test section 24 without significantly restricting the working space of the welding robot.

Of course, in an alternative embodiment, an expansion cylinder 34 of any desired size may be provided, for example having a diameter of 80 mm or 100 mm.

The expansion cylinder 34 is coupled to a pneumatic unit 42 via the control unit 26, the pneumatic unit forming the drive of the expansion cylinder 34.

The control unit 26 can be made use of to set a counter-pressure on the piston 38 with respect to the pressure of the cooling water in the test section 24, which can be used to dampen the expansion of the volume of the expansion chamber 36.

When the valves 18, 22 are in the closed position, the pressure in the test section 24 can be reduced by means of the expansion cylinder 34 by increasing the volume of the expansion chamber 36, thereby increasing the total volume. Furthermore, when the valves 18, 22 are in the closed position, the pressure in the test section 24 can be increased by means of the expansion cylinder 34 by reducing the volume of the expansion chamber 36, thereby decreasing the total volume.

During operation of the spot-welding robot, up to 30 l of cooling water per minute and cap flow to the welding cap 12, depending on the material and design. In nominal operation, the cooling water has a temperature of between 20° C. and 40° C. here and is generally acted upon with a pressure of up to 5.5 bars. For the following exemplary embodiments, a pressure is assumed that results in a supply pressure of about 5.5 bars in the test section 24 when the valves 18, 22 are fully open.

Based on the measurement data of the flow sensor 32, leakages leading to unexpected plunges in the volumetric flow rate can be detected during flow monitoring.

In order to detect minor leakages, in particular those that are below the detection threshold of the flow monitoring, the control unit 26 features a plurality of test modes, which will be discussed below.

In all of the test modes, a pressure drop measurement is carried out in the test section 24 by means of the pressure sensor 30 while the valves 18, 22 are in the closed position.

In order to restart the cooling water flow through the cooling water pipe 14, the valves 18, 22 are reopened after one or more pressure drop measurements, in particular if no leakage has been detected.

Preferably, the pressure drop measurement is performed at a time when the limited cooling of the welding cap 12 due to the closed condition of the valves 18, 22 is negligible, for example during a non-working or non-welding time period.

Furthermore, the pressure drop measurement is carried out at overpressure, i.e., at a pressure of the cooling water in the test section 24 that is higher than the supply pressure of 5.5 bars, in order to shorten the duration of a robust pressure drop measurement.

In a first test mode of the control unit 26, the control unit 26 first closes the return valve 22 and, deliberately time-delayed in relation thereto, the inlet valve 18. This increases the pressure of the cooling water in the test section 24.

Subsequently, the control unit 26 carries out a pressure drop measurement at an overpressure, which in the present case is about 6 bars.

Here, the expansion cylinder 34 is controlled by the control unit 26 in such a way that the volume of the expansion chamber 36 remains substantially constant, for example by applying a counter-pressure to the piston 38 with respect to the pressure of the cooling water in the test section 24 or by adjusting the expansion cylinder 34, before the valves 18, 22 are closed, to a position in which the volume of the expansion chamber 36 is at a maximum.

In a second test mode of the control unit 26, the control unit 26 first closes the return valve 22 and, with a time delay relative thereto, the inlet valve 18. This increases the pressure of the cooling water in the test section 24.

Now the control unit 26 reduces the volume of the expansion chamber 36, as a result of which the pressure of the cooling water in the test section 24 increases further. This requires that the expansion cylinder 34, before the valves 18, 22 are closed, is in a position in which the volume of the expansion chamber 36 can be reduced by means of the piston 38. If this is not the case, the control unit 26 will adjust the expansion cylinder 34 to an appropriate position before the valves 18, 22 are closed.

Subsequently, the control unit 26 performs a pressure drop measurement at an overpressure, which in the present case is about 8 bars.

In an alternative embodiment, the valves 18, 22 may be closed in any desired order or simultaneously in the second test mode.

In a third test mode of the control unit 26, the control unit 26 first closes the return valve 22 and, with a time delay relative thereto, the inlet valve 18. This increases the pressure of the cooling water in the test section 24.

Now the control unit 26 increases the volume of the expansion chamber 36, as a result of which the pressure of the cooling water in the test section 24 decreases. This requires that the expansion cylinder 34, before the valves 18, 22 are closed, is in a position in which the volume of the expansion chamber 36 can be increased by means of the piston 38. If this is not the case, the control unit 26 will adjust the expansion cylinder 34 to an appropriate position before the valves 18, 22 are closed.

Optionally, the welding cap 12 can be changed at this time when the pressure has been reduced.

Subsequently, the control unit 26 reduces the volume of the expansion chamber 36, as a result of which the pressure of the cooling water in the test section 24 increases.

Preferably, the control unit 26 reduces the volume of the expansion chamber 36 below the volume that the expansion chamber 36 had prior to the increase, which allows a higher pressure of the cooling water in the test section 24 to be generated. This requires that the expansion cylinder 34, before the valves 18, 22 are in the closed position, be in an appropriate intermediate position in which the volume of the expansion chamber 36 can first be increased by means of the piston 38 and then decreased appropriately. If this is not the case, the control unit 26 adjusts the expansion cylinder 34 to an appropriate intermediate position before the valves 18, 22 are closed.

Subsequently, the control unit 26 carries out a pressure drop measurement at an overpressure, which in the present case is about 7.5 bars after a welding cap change.

In an alternative embodiment, in the third test mode the valves 18, 22 may be closed in any desired order or simultaneously.

In a fourth test mode of the control unit 26, the control unit 26 first closes the inlet valve 18 and, with a time delay relative thereto, the return valve 22. This initially lowers the pressure of the cooling water in the test section 24.

Now the control unit 26 increases the volume of the expansion chamber 36, which causes the pressure of the cooling water in the test section 24 to decrease further. This requires that the expansion cylinder 34, before the valves 18, 22 are closed, be in a position in which the volume of the expansion chamber 36 can be increased by means of the piston 38. If this is not the case, the control unit 26 will adjust the expansion cylinder 34 to an appropriate position before the valves 18, 22 are closed.

Optionally, the sealing cap 12 can be changed at this time when the pressure has been reduced.

In a subsequent step, the inlet valve 18 is opened temporarily and then closed again in order to increase the pressure of the cooling water in the test section 24.

Now, the control unit 26 reduces the volume of the expansion chamber 36, which causes the pressure of the cooling water in the test section 24 to increase further.

Subsequently, the control unit 26 performs a pressure drop measurement at an overpressure, which in the present case is about 8 bars after a welding cap change.

Basically, the pressure drop measurements can be carried out at any desired pressures. However, it is of advantage if the pressure drop measurements are performed at an overpressure which is at least 110%, in particular at least 130% of the supply pressure.

Of course, in an alternative embodiment, the control unit 26 may feature any desired number of the test modes discussed above, i.e., the first, the second, the third, and/or the fourth test mode.

In this way, even minor leakages can be reliably detected by means of a pressure drop measurement; owing to the high pressure, the measuring time can be greatly reduced here.

Furthermore, the tightness of the test section 24 can be tested immediately after changing or milling off the welding cap 12 with the valves 18, 22 closed, so that a leakage can already be detected before coolant flows through the test section 24. Thus, system reliability is increased since the absence of a welding cap 12 or a loss of cooling water at the welding cap 12 is reliably detected.

If a leakage is detected, it is also possible to react immediately and initiate a welding cap change in a next step.

By carrying out the milling off of the welding caps 12 or a welding cap change in a timely manner and faultlessly, the downtimes of the welding robot can be reduced.

Moreover, the number of defective weld spots is reduced because functional and cooled welding caps 12 are available at all times, resulting in fewer rejects being produced.

The controlled welding cap cooling allows a higher welding quality and process reliability as well as cost and energy consumption savings to be achieved.

In addition, the system is configured for cloud applications such as remote diagnostics.

Since the inlet valve 18 and the return valve 22 as well as the expansion cylinder 34 are switchable separately from each other, the tightness of the welding caps 12 can be reliably monitored by using the methods described above.

As a result, the welding caps 12 can be milled off more often and need to be changed less frequently; as a result, more time is available for production in each case.

Furthermore, adjustment and readjustment during startup can be dispensed with.

The welding caps 12 can now be changed more quickly, since the actual pressure in the sealed test section 24 can be measured by means of the pressure sensor 30. Thus, the welding caps 12 can be detached immediately after the pressure compensation.

The invention is not limited to the embodiment shown and described. In particular, individual features of one embodiment may be combined with features of other embodiments as desired, in particular independently of the other features of the respective embodiments.

The invention claimed is:

1. A method of controlling a welding cap cooling water controller, comprising:
providing a cooling water pipe which includes a cooling water inlet leading towards at least one welding cap and having a switchable inlet valve for closing the cooling water inlet and a cooling water return leading away from the at least one welding cap and having a switchable return valve for closing the cooling water return, a section of the cooling water pipe that is arranged downstream of the inlet valve and upstream of the return valve forming a test section of the cooling water pipe;
providing a pressure sensor that is configured for pressure measurement of the cooling water in the test section;
providing a control unit that is coupled to the pressure sensor, the inlet valve and the return valve for signal transmission;
increasing pressure of cooling water in the test section to an overpressure that is above a supply pressure which prevails in the test section during a welding process with the inlet valve open and the return valve open; and
performing a pressure drop measurement at the overpressure.

2. The method according to claim 1, characterized in that the overpressure is at least 110% of the supply pressure.

3. The method according to claim 1, characterized in that the overpressure is at least 6 bars.

4. The method according to claim 1, further comprising providing a switchable expansion cylinder which is coupled to the control unit for signal transmission and is configured to receive cooling water from the test section and to return cooling water to the test section.

5. The method according to claim 4, characterized in that the method of increasing the pressure of the cooling water in the test section to an overpressure includes a following sequence of steps:
  closing the return valve and the inlet valve; and
  increasing the pressure in the test section by means of the expansion cylinder.

6. The method according to claim 5, characterized in that when closing the return valve and the inlet valve, the return valve is closed first and, with a time delay relative thereto, the inlet valve is closed.

7. The method according to claim 4, characterized in that the method of increasing the pressure of the cooling water in the test section to an overpressure includes a following sequence of steps:
  closing the return valve and the inlet valve;
  reducing the pressure in the test section by means of the expansion cylinder; and
  increasing the pressure in the test section by means of the expansion cylinder.

8. The method according to claim 4, characterized in that the method of increasing the pressure of the cooling water in the test section to an overpressure includes a following sequence of steps:
  closing the inlet valve;
  closing the return valve with a time delay;
  reducing the pressure in the test section by means of the expansion cylinder;
  opening and time-delayed closing of the inlet valve; and
  increasing the pressure in the test section by means of the expansion cylinder.

9. The method according to claim 1, characterized in that an expansion cylinder is provided which includes an expansion chamber having a movable wall which is adapted to be acted upon with an adjustable counter pressure in relation to the pressure of the cooling water in the test section.

10. The method according to claim 1, characterized in that the method of increasing the pressure of the cooling water in the test section to an overpressure includes a following sequence of steps:
  closing the return valve; and
  closing the inlet valve with a time delay.

11. A welding cap cooling water controller, comprising:
  a cooling water pipe which includes a cooling water inlet leading towards at least one welding cap and having a switchable inlet valve for closing the cooling water inlet and a cooling water return leading away from the at least one welding cap and having a switchable return valve for closing the cooling water return, a section of the cooling water pipe that is arranged downstream of the inlet valve and upstream of the return valve forming a test section of the cooling water pipe;
  a pressure sensor that is configured for pressure measurement of cooling water in the test section; and
  a control unit that is coupled to the pressure sensor, the inlet valve and the return valve for signal transmission,
  wherein the control unit is configured to increase the pressure of the cooling water in the test section to an overpressure that is above a supply pressure which prevails in the test section during a welding process with the inlet valve open and the return valve open, and to perform a pressure drop measurement at the overpressure.

* * * * *